Aug. 6, 1935.  H. E. LEWIS  2,010,522
FISHING REEL
Filed April 16, 1935
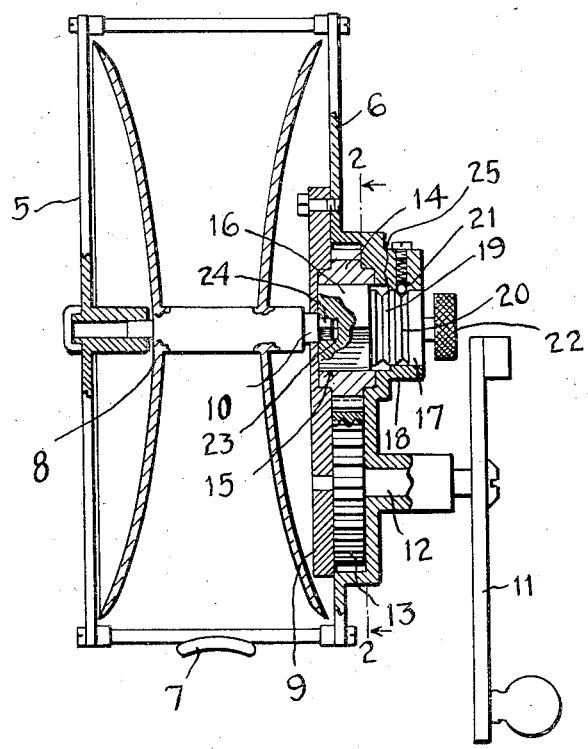
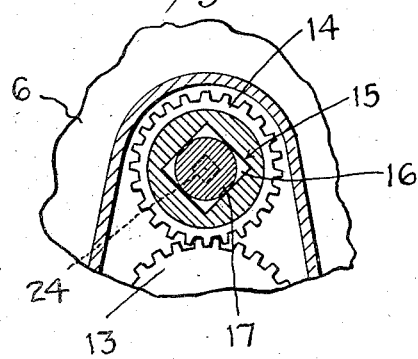
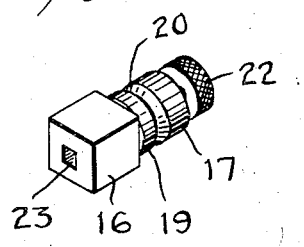
INVENTOR
*Howard E. Lewis*
BY
HIS ATTORNEY Patented Aug. 6, 1935

2,010,522

UNITED STATES PATENT OFFICE 2,010,522

FISHING REEL

Howard E. Lewis, Irvington, N. J.

Application April 16, 1935, Serial No. 16,539

8 Claims. (Cl. 242—84.7)

The invention relates to fishing reels and has for its particular object to provide a free-spooling arrangement for such reels.

Numerous devices for this purpose have been manufactured, sold and patented but as far as applicant has been able to ascertain they are complicated and expensive to manufacture. The most common type of free spool reel in use is one in which the driving gear or the gear on the reel handle is thrown out of mesh with the driven gear or the gear on the spindle of the reel spool. After the parts of the reel become somewhat worn there is a decided tendency, when the reel is under a strain, of the gears falling out of engagement. This is most serious, particularly if the angler is attempting to land a large fish. The present invention contemplates a free-spooling arrangement which is of extreme simplicity, one that will add very little to the cost of manufacture of the reel, and one that is absolutely efficient in operation.

Other advantages will become apparent as this specification proceeds. Referring to the drawing forming a part thereof and in which a preferred embodiment of the invention is illustrated:

Fig. 1 is a longitudinal sectional view of the improved fishing reel;

Fig. 2 is a fragmentary detail sectional view taken on line 2—2 of Fig. 1; and

Fig. 3 is a detail perspective view of one of the important elements of the device.

Referring again to said drawing the reel comprises the usual frame-work including the end plates 5 and 6, foot-plate 7 for attachment to the fishing rod and the spool 8. The end plate 6 serves as part of the gear housing.

Secured to the inner side of the end plate 6 is a bearing plate 9 which completes the gear housing and provides a bearing for the spool spindle 10. The opposite end of the spool spindle has the conventional bearing in the end plate 5.

Fig. 1 shows the position the parts would assume when the spool 8 is being driven by the crank or reel handle 11. This crank as usual is suitably secured to the outer end of a shaft 12, on the inner end of which is mounted the gear 13. The gear 13 meshes the pinion 14, the hub of said pinion having annular bearings in the end plate 6 and the bearing plate 9.

The pinion 14 has a squared aperture 15 with which a slidably mounted square block 16 cooperates. The block 16 is provided with a hub 17 which has a bearing in a boss 18 on the end plate 6. The hub 17 has annular grooves 19 and 20, either one of which is adapted to be engaged by a spring pressed ball or detent 21. The hub is further provided with a finger piece or handle 22.

The inner end of the block 16 is provided with a squared aperture 23 which in the driving position is engaged with a squared end 24 of reel spindle. In the driving position the bearing plate 9 provides an abutment for the block 16 and in the free spooling position a shoulder 25 acts as the abutment.

When it is desired to move the reel into the free-spooling position the handle 22 is grasped and pulled outwardly. The ball or detent 21 is retracted from the groove 20 and will engage the annular groove 21, at which time the outer end of the block 16 will abut the shoulder 25. The squared end 24 of the reel spindle will be moved out of engagement with its socket 23 and the spool 8 is free to rotate. The handle or button 22 naturally is pulled outwardly prior to casting the line. After the cast has been completed a slight pressure of the thumb or forefinger on the button 22 will cause the block 16 to move inwardly and the socket 23 will engage the squared end 24 of the reel spindle. The parts will then be in the position shown in Fig. 1, and the line may be reeled in. At no time will the gears 13 and 14 ever be disengaged and as there is no strain or stress longitudinally of the axis of the gear spindle the light spring pressed ball or detent 21 will be ample to always insure the parts remaining in driving engagement or vice versa.

Changes in details of construction such as might be made by one skilled in the art are to be considered as coming within the spirit of the invention and the scope of the appended claims.

I claim:

1. A fishing reel having in combination a frame-work, a spool, a spindle for said spool, a driving pinion for said spool, a gear for driving said pinion, said gear and said pinion always being in engagement with each, a polygonal aperture in said pinion, a slidable polygonal-shaped block to engage said aperture, a polygonal-shaped socket in said block, a polygonal-shaped end on said spindle to engage said socket, and means for moving said block so that said polygonal-shaped end on said spindle may be engaged or disengaged with said socket.

2. A fishing reel having in combination a frame-work, a spool, a spindle for said spool, a driving pinion for said spool, a gear for driving said pinion, said gear and said pinion always being in engagement with each, a polygonal aperture in said pinion, a slidable polygonal-shaped block to engage said aperture, a polygonal-shaped socket in said block, a polygonal-shaped end on said spindle to engage said socket, means for moving said block so that said polygonal-shaped end on said spindle may be engaged or disengaged with said socket, and frictional means for holding said block in either of the two positions.

3. A fishing reel having in combination a spool, a spindle for said spool, a polygonal-shaped end on said spindle, a driving pinion for said spool, a gear for driving said pinion, said gear and said pinion always being in engagement with each other, a polygonal-shaped block slidably mounted in said pinion, a polygonal-shaped socket on the inner end of said block to engage the polygonal-shaped end of said spindle, and means for moving said block into or out of engagement with the end of said spindle.

4. A fishing reel having in combination a spool, a spindle for said spool, a polygonal-shaped end on said spindle, a driving pinion for said spool, a gear for driving said pinion, said gear and said pinion always being in engagement with each other, a polygonal-shaped block slidably mounted in said pinion, a polygonal-shaped socket on the inner end of said block to engage the polygonal-shaped end of said spindle, a hub on said block, and frictional means engaging said hub whereby the socket in said block may be held in or out of engagement with the end of said spindle.

5. A fishing reel having in combination a spool, a spindle for said spool, a polygonal-shaped end on said spindle, a driving pinion for said spool, a gear for driving said pinion, said gear and said pinion always being in engagement with each other, a polygonal-shaped block slidably mounted in said pinion, a polygonal-shaped socket on the inner end of said block to engage the polygonal-shaped end of said spindle, a hub on said block, a pair of annular grooves in said hub, and spring pressed means to engage either one of said annular grooves so as to maintain the end of said spindle in or out of engagement with said socket.

6. A fishing reel having in combination a framework, a spool, a spindle for said spool, a driving pinion for said spool, a gear for driving said pinion, said gear and said pinion always being in engagement with each, a non-rotatable block slidably mounted in said pinion, means on the inner end of said block for co-operating with said spindle so that said spindle may be engaged with or disengaged from said block, and means for moving said block longitudinally in relation to said pinion to effect such engagement or disengagement.

7. A fishing reel having in combination a framework, a spool, a spindle for said spool, a driving pinion for said spool, a gear for driving said pinion, said gear and said pinion always being in engagement with each, a non-rotatable block slidably mounted in said pinion, a polygonal-shaped socket in said block, a polygonal-shaped end on said spindle to engage said socket, and means for moving said block longitudinally in relation to said pinion so that said polygonal-shaped end on said spindle may be engaged with or disengaged from said socket.

8. A fishing reel having in combination a framework, a spool, a spindle for said spool, a driving pinion for said spool, a gear for driving said pinion, said gear and said pinion always being in engagement with each, a polygonal aperture in said pinion, a slidable polygonal-shaped block to engage said aperture, means on the inner end of said block for co-operating with said spindle so that said spindle may be engaged with or disengaged from said block, and means for moving said block longitudinally in relation to said pinion to effect such engagement or disengagement.

HOWARD E. LEWIS.